United States Patent
Steffen

[19]

[11] 4,026,827
[45] May 31, 1977

[54] PREPARATION OF HIGH-MOLECULAR WEIGHT THERMOPLASTIC POLYORGANOSILICIC ACID ESTERS

[75] Inventor: Klaus-Dieter Steffen, Troisdorf, Oberlar, Germany

[73] Assignee: Dynamit Nobel Aktiengesellschaft, Troisdorf, Germany

[22] Filed: Nov. 14, 1972

[21] Appl. No.: 306,490

Related U.S. Application Data

[63] Continuation of Ser. No. 109,679, Jan. 25, 1971, abandoned.

[30] Foreign Application Priority Data

Jan. 24, 1970  Germany .......................... 2003237

[52] U.S. Cl. .......................... 260/2 S; 260/46.5 R; 260/46.5 G; 260/47 R; 260/448.2 E
[51] Int. Cl.² .......................................... C08G 77/00
[58] Field of Search .................. 260/46.5 R, 46.5 P, 260/47 R, 448.2 E, 2 S

[56] References Cited
UNITED STATES PATENTS 2,967,171   1/1961   Barnes, Jr. et al. .............. 260/46.5

Primary Examiner—Melvyn I. Marquis
Attorney, Agent, or Firm—Burgess, Dinklage & Sprung

[57] ABSTRACT

The preparation of high-molecular weight, thermoplastic, linear and branched polyorganosilicic acid esters of the formula:

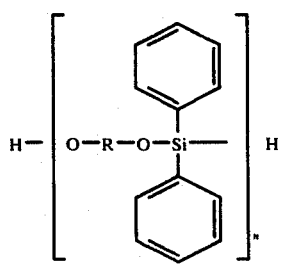

$= 1 - 3$
$n = 100 - 500$, preferably $180 - 300$ from polyvalent phenols and/or alcohols and diphenyl silane accompanied by the separation of hydrogen according to the equation:

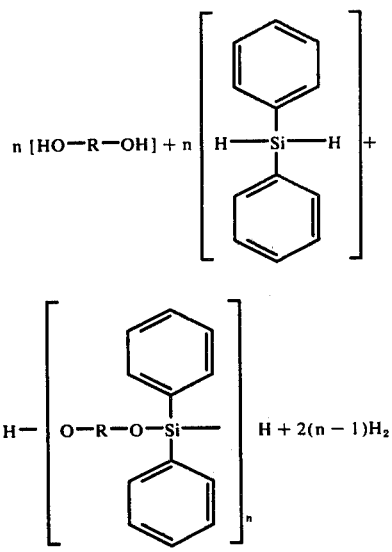

wherein:
the reaction is carried out at 0° to 320° C in the liquid phase in contact with a catalyst which is a basic compound, an active hydrogenation catalyst, a Lewis acid or hexachloroplatinic acid.

In the formulae, R stands for an arylene or alkylene group which is the essence of the aromatic, aliphatic or cycloaliphatic hydroxy compound reacted.

11 Claims, No Drawings

PREPARATION OF HIGH-MOLECULAR WEIGHT THERMOPLASTIC POLYORGANOSILICIC ACID ESTERS

This is a continuation of application Ser. No. 109,679 filed Jan. 25, 1971 and now abandoned.

This invention relates to aryl siloxane polymers. It more particularly refers to a new and improved method of making such polymers.

It is known that high-molecular poly(dioxy arylene diphenyl silanes) or poly(dioxyalkylene diphenyl silanes) could up till now be prepared only by polycondensations of dianilino-dialkyl(or-diaryl) silanes with diols accompanied by the separation of aniline (W.R. Dunnavant, R. A. Markel, R. G. Sinclair, P. B. Stickney, J. E. Curry, J. D. Byrd, Macromolecules 1 (1968)249). This method has the drawback, among others, that aniline is separated during the reaction and this compound must then be removed by slowly distilling it off. Furthermore, the presence of liberated aniline often leads to undesirable side reactions.

Attempts to react chlorophenyl silane directly with dihydroxy compounds to produce higher-molecular weight condensation products in the presence of known catalysts has to date led only to the production of low-molecular weight compounds.

It is therefore an object of this invention to provide a novel means of producing poly (arylene) or (alkylene) siloxanes.

It is another object of this invention to utilize in such process only such reactants which generate readily removable by-products.

Other and additional objects of this invention will become apparent from a consideration of this entire specification including the claims hereof.

In accord with and fulfilling these objects, one aspect of this invention lies in reacting a dihydric arylene or alkylene compound with a diphenyl silane at about 0° to 300° C in the liquid phase in contact with a catalyst selected from the group consisting of basic compounds, materials which are known good hydrogenation catalysts, Lewis acids and hexachloroplatinic acid to produce a polysiloxane polymer of the formula:

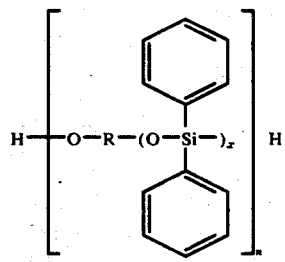

wherein:
R is an arylene or an alkylene hydrocarbon group, $x$ is 1 to 3 and $n$ is 100 to 500, preferably 180 to 300, and, as a by-product, hydrogen:

These are produced just less than two times the value of $n$ moles of hydrogen which is taken over head out of the condensation polymerization reaction.

The new method of this invention has, as against the known prior art method, the following advantages:

1. Gaseous hydrogen which is quantitatively produced in the reaction immediately escapes as compared to the prior slow distillation of high-boiling condensates which slow distillation is therefore eliminated.

2. The reaction equilibrium is very favorably influenced in favor of the polycondensation through the quantitative removal of the hydrogen. The reaction times can therefore be quite short and products of high molecular weight are obtained in substantially quantitative yields.

3. Practically no undesirable side reactions take place; therefore substantially colorless or only very slightly colored polymers are obtained.

4. By collecting the gaseous hydrogen in a gas burette a simple and accurate kinetic control of the reaction process is made possible.

The diphenyl silane used as the reactant can be produced with a high degree of purity by the known reduction of diphenyl dichlorosilane with lithium aluminum hydride (R. A. Benkeser, H. Landesmann and D. J. Foster, J. Amer. Chem. Soc. 74 (1952) 648).

Suited as the second reactant for the preparation of the polysiloxane of this invention are mono- or poly nuclear, bi-or multivalent phenols with hydroxyl groups which are not in the ortho position or otherwise adjacent to each other. The ring of such phenols, where there are multiple rings can be either condensed or not condensed. Bivalent phenols whose hydroxyl groups are in the ortho position or adjacent to each other are not appropriate for this polymerization because of their tendency to form cyclic silicic acid esters rather than polymer chains.

Suitable bi- or multi-valent mononuclear phenols are e.g. hydroquinone, resorcinol, phloroglucin, 2,4 dihydroxynaphthalene, 2,5 dihydroxynapthalene, 2,7 dihydroxynapthalene, etc.

polynuclear, bi- or multi-valent phenols whose nuclei are not condensed can be characterized by e.g. the following general formula:

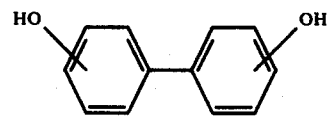

wherein,
the OH groups are in other than the 2,2' or 6,6' position.

Examples for such phenols are 4,4'-dihydroxy diphenyl, 2,4'-dihydroxy diphenyl, 3,3'-dihydroxy diphenyl, 4,4'-dihydroxy-2-methyldiphenyl, 4,4'-dihydroxy-2,2'-dimethyl diphenyl, 4,4'-dihydroxy-3,3'-dimethyl diphenyl 4,4'-dihydroxy-3,3', 5,5'-tetramethyl diphenyl, 4,4'-dihydroxy-diphenyl methane, 4,4'-dihydroxy-diphenyl ether or sulfone, or 4,4'-dihydroxy-tetraphenyl methane, phloroglucide and phenolphthalein, all of which can be used according to the invention.

Suitable polynuclear, condensed, bivalent pheols are, among others, dihydroxy naphthalenes or anthracenes etc., such as the 1:3-dihydroxy naphthalene 1:4-dihydroxy naphthalene, 1:5-dihydroxy naphthalene, 1:6-dihydroxy naphthalene, 1:7-dihydroxy naphthalene, 2:6-dihydroxy naphthalene and 2:7-dihydroxy naphthalene or 2:6:8-trihydroxynaphthalene and there corresponding anthracenes and/or phenanthracenes.

The mono- or polynuclear groups of this invention as illustrated by the aforementioned bivalent phenols can also carry alky, alkoxy, halogen and/or phenoxy groups as substituents, provided these are substantially inert to the polycondensation in issue here. Of course, mixtures of the aforementioned phenols can also be used for the reaction according to the invention.

As aliphatic alkylene dihydroxy compounds, both straight-chained and branched multi-valent alcohols can be used, such as e.g. ethylene glycol, trimethylene glycol and the corresponding polyol compounds of this homologous series.

As examples for cycloaliphatic compounds may be mentioned: Cyclohexane dimethanol, and 2,2,4,4-tetramethyl-cyclobutanediol-1,3.

Where alkyl, alkoxy or alkylene groups are mentioned herein it is preferred that they have a chain length of up to about 8 carbon atoms. Cycloalkyl groups should be saturated and contain about 4 to 12 carbon atoms in the ring with the possibility of one or more alkyl or halo substituents on the ring. Halo substituents are suitably inert and may be fluorine, chlorine, bromine or iodine with chlorine being preferred.

When using bivalent hydroxy compounds, linear thermoplastic polyorganosilicic acid esters (polysiloxanes) are obtained. When substituting multi-valent hydroxy compounds for part or all of the referred to bivalent compounds, more or less branched and cross-linked polymers result whose thermoplastic properties decrease as the proportion of multi-valent hydroxy compound increases. It is therefore of advantage to use only up to about 10% of the multi-valent hydroxy compound in place of the bivalent hydroxy compound so as to obtain a polysiloxane polymer which has good processibility.

The polycondensation of diphenyl silane with multi-valent alcohols or phenols can be carried out in the liquid phase, both in solution and in the melt. In the melt, polycondensation temperatures are employed that lie in the vicinity of the melting point of the diol, but should be at least about 100° C. With melt polycondensations that are carried out at 200° C and higher, the reaction may proceed quite violently so that within 10 minutes the entire theoretically separable amount in hydrogen is generated.

For the solution polycondensation, substantially aprotic, inert, substantially anhydrous solvents can be used. To be able to carry out the condensation at a usable speed solvents with boiling points of 100° C and higher are preferably used.

As suitable solvents, aromatic hydrocarbons e.g. toluene and xylene and cyclic ethers, such as dioxane and tetrahydrofuran have proved themselves to be quite useful. In addition, heterocycles, like pyridine and its derivatives can be used as solvents. Further, N,N-dialkylated acid amides of $C_1$-$C_3$-carboxylic acids, such as dimethylformamide, diaethylformamide or dimethylacetamide are also suited to use in this invention as is aniline. The concentration of the two monomers, the diphenyl silane and the polyhydroxy compound, in the solution can be varied within wide limits of about 90 to 5 weight percent. Usually a 20 weight percent solution of each monomer is used.

The solution polycondensation is in most cases to be preferred over the melt polycondensation since lower temperatures can be used in solution which makes possible a more carefully controlled operation. Further, no sublimation or distillation off of phenols and alcohols at or near their melting or boiling points has to be feared, which could lead to a change of the stoichiometry of the monomers as determined by the weighed-in quantities.

To obtain high polymer viscosities, a slight excess of about 0.1 – 5 mole percent of the diphenyl silane reactant is preferably used. The temperature at which the condensation in solution is carried out is largely a function of the boiling point of the solvent used. As much as possible, condensation should be effected under reflux conditions that is, at about the boiling temperature of the solvent. In some cases the reaction at this temperature however is so violent that is is preferably to condense at lower temperatures at which the reaction will then be slower.

The reaction will proceed only under the influence of catalysts. A large number of compounds have been found to catalyze the condensation reaction. These catalysts may be classified in the following groups:
1. Basic compounds
2. Active hydrogenation catalysts
3. Lewis acids
4. Hexachloroplantinic acid Examplary basic compound catalysts are the alkali metals and their hydrides, alkali metal salts of those acids whose pK-value is greater than 4, provided that the aqueous alkali metal salt solution reacts in a neutral or slightly basic manner. Examples for these salts are: Sodium acetate, lithium stearate or the corresponding phenolates. Alkali metal alcoholates also fall within this group of catalytically active compounds.

It has been found that the more basic the alkali metal is the better the catalytic action thereof will be. Only traces of the alkali metal or of the alkali metal salts or compounds are required for this catalysts. A suitable range is $\Lambda$ to 0,00$\Lambda$ weight percent based on the reactant weight.

Basic, catalytically active compounds also include those amines having a pK-value of <5. It is preferred that those amines which are most basic and slightly higher boiling be used, e.g. dibutyl amine, dipropyl amine, piperidine and the like. The use of amines as catalysts is perferred whenever halogenated bisphenols or halogenated diols are used as hydroxy reactant compounds.

Active hydrogenation catalysts include those materials, particularly noble metals which are known as active hydrogenation catalysts, as for example platinum, palladium, Raney nickel, etc.

Lewis acids are, for example, the halides of the metals of the 1st to 4th groups of the periodic system, e.g. $ZnCl_2$, $AlCl_3$, $CuCl_2$ or $SnCl_4$.

Hexachloroplatinic acid is particularly useful as a catalyst where preponderantly cross-linked products are desirably obtained.

The polycondensation is continued for a reaction time such that the theoretically calculated amount of hydrogen has been split off. This can be, depending on the particular catalyst, temperature and solvent used, several minutes to several hours. After hydrogen generation has been completed, the condensation is continued for about 2h under vacuum at about 200° C.

The transparent, colorless polymer products are usually thermoplasts as noted above with all the good processing properties of such materials. They are readily soluble in most organic solvents like benzene, toluene, tetrahydrofuran, dimethyl formamide, dioxane, pyridine, acetone, chloroform and the like. Since the polymers can be hydrolytically decomposed in contact with bases, it is advisable when dissolving of the polymers in basically acting solvents to bind the basic catalysts, to add small amounts of dry clacial acetic acid (up to 0.5% by weight of the polymer) to the reaction mixture.

The polyorganosilicic esters possess good thermal stabilities and can be used as molding materials or coatings for insulation purposes, or for laminate production.

The following examples will serve to illustrate the practice of this invention without being limiting thereon.

EXAMPLE 1

Into a round-bottom flask were weighted 4,5659 g of bisphenol A (0.02 mol) and 3,7665 g of diphenyl silane (2.2 mole % excess) and a small drop of a 5%-potassium methylate solution added. After putting on a small reflux condenser the apparatus was thoroughly flushed with $N_2$, connected to a gas burette and heated in an oil bath to 160° C. After about 1 liter of $H_2$ had been collected at the end of one hour the temperature was raised to 200° C and after a further hour first a water jet vacuum, and then oil pump vacuum were applied. The polymer yield was estimated to be 99% of theory, but in most cases cannot be absolutely determined since during cooling of the polymer melt, the glass flask burst.
Softening point: ca. 120° C
$\eta$ red. 0.95 dl/g (0.5% in tetrahydrofuran with a drop of glacial acetic acid).

EXAMPLE 2

In the same apparatus as described in example 1, 4,5659 g of bis-phenol A (0.02 mol), and 3,7603 g of diphenyl silane (2% excess) were weighted in and 20 ml anhydrous dioxane and one drop of potassium methylate solution were added. The system was flushed with $N_2$ and then heated to 120° C in an oil bath. After two hours the total amount of hydrogen, about 1 liter had been generated. Heating was continued another 3 hours under reflux, then the solvent was distilled off and the remainder freed, in an oil pump vacuum at 200° C, from all volatile components.
Softening point: ca. 130° C
$\eta$ red. 0.6 dl/g (0.5% in tetrahydrofuran with a drop of glacial acetic acid).

EXAMPLE 3

Analogously to example 2, the solution polycondensation was carried out in xylene with a small piece of potassium metal of about 0.5 to 1 sq. mm size, at 150° C (oil bath). After about three hours, the hydrogen generation was completed. Heating was likewise continued for another three hours and then the solvent distilled off in a vacuum.
Softening point: ca. 115° C
$\eta$ red. 0.7 dl/g (0.5% in tetrahydrofuran with a drop of glacial acetic acid).

EXAMPLE 4

Into a round-bottom flask, 4,6552 g of p,p'-diphenol (0.025 mol) and 4,7464 g of diphenyl silane (3% excess) were weighed in and mixed with a small drop of 5% potassium methylate solution. After flushing with $N_2$ the flask was connected through a small reflux condenser to a gas burette. The reaction mixture was heated in an oil bath to 220° C. At this temperature a vigorous hydrogen generation set in so that within about ten minutes the entire amount of about 1.2 liters was collected. Heating was continued for another two hours, then further condensed in oil pump vacuum at 240° C. The solidified polymer melt broke the glass flask.
Softening point: ca. 150° C
$\eta$ red. 0.6 dl/g (0.5% in tetrahydrofuran with a drop of glacial acetic acid).

EXAMPLE 5

3,7242 g of p,p'-diphenol (0.02 mol) -, 3,6926 g of diphenyl silane were heated, after addition of a drop of potassium methylate solution and flushing with $N_2$, in 20 ml anhydrous dioxane, to 120° C (oil bath). After three hours, the entire amount in hydrogen had developed. The mixture was left for another three hours at this temperature, then the solvent distilled off and finally, at 240° C in an oil pump vacuum, freed from all solvent rests.
Softening point: ca. 150° C
$\eta$ red. 0.6 dl/g (0.5% in tetrahydrofuran with a drop of glacial acetic acid).

EXAMPLE 6

2,2023 g of hydroquinone (0.02 mol) were, as as in the preceding examples, melt polycondensed with 3,8056 g of diphenyl silane (3.2% excess), after addition of a small drop of potassium methylate solution, at 175° C within 13 hours. Following that, the melt was further condensed at 200° C in oil pump vacuum for two hours.
Softening point: ca. 80° C
$\eta$ red: 1,1 dl/g (0.5 in $CHCl_3$ with a drop of glacial acetic acid).

EXAMPLE 7

2,8843 g of cyclohexane dimethanol (0.02 mol) are, as described in the preceding examples, melt condensed with 3,6899 g of diphenyl silane (0.1% excess), after addition of one drop of 5%-potassium methylate solution. The reaction set in immediately. The condensation was effected for about 2 hours at 100° C, about 3 hours at 150° C under normal pressure and 1.5 hours at 150° C in oil pump vacuum.
Yield: 6.45 g (99.4% of the theory)
Softening point: 60°–70° C,
$\eta$ red: 0.55 dl/g (0.5% in tetrahydrofuran with a drop of glacial acetic acid).

EXAMPLE 8

2,2023 g of resorcin (0.02 mol) are in the usual manner polycondensed with 3,760 g of diphenyl silane (2.0% excess) after addition of 20 ml anhydrous dioxane and a few grains NaH at the boiling temperature of dioxane. After completed $H_2$ generation the solvent was distilled off and the melt further condensed at 200° C in vacuum of 0.05 mm Hg for 2 hours.
Yield: 5,75 g (98.9% of the theory)
Softening point: 70° to 80° C,
$\eta$ red: 0.7 dl/g (0.5% in tetrahydrofuran with a drop of glacial acetic acid).

EXAMPLE 9

4,5658 g of bisphenol A (0.02 mol) and 3,7415 g of diphenyl silane (1.5% excess) are in the above set forth manner melt polycondensed with a few crystal grains of dry sodium acetate first at 175° C for 4 hours, and then at 200° C for another 2 hours. Condensation was continued in an oil pump vacuum for 2 hours at 200° C.

Yield: 8.15 g (99.8% of the theory)
Softening point: 115° to 120° C,
η red: 0.8 dl/g (0.5% in tetrahydrofuran with one drop of glacial acetic acid).

EXAMPLE 10

6,480 g of 3,3',5,5'-tetrachloro-4,4'-dihydroxydiphenyl (0.02 mol) are melt polycondensed with 3,736 g of diphenyl silane (1.4% excess), after addition of 0.1 ml anhydrous dibutyl amine, first at 160° C, then at 200° and 250° C. The viscous melt was finally treated at 250° C in a 0.05 mm vacuum within 2 hours.
Softening point: 220° to 250° C,
η red: 1.2 dl/g (0.5% in toluene with a drop of glacial acetic acid).

EXAMPLE 11

According to the melt polycondensation described in the preceding examples, there was prepared from 7,322 g of 3,3', 5,5'-tetrachloro-bis-phenol A (0.02 mol) and 3,691 g of diphenyl silane with 0.1 ml anhydrous dibutyl amine the corresponding polyorganosilicic acid ester (polysiloxane).
Yield: 10.9 g (99.6% of the theory)
Softening point: 180° to 200° C,
η red: 0.4 dl/g (0.5% in tetrahydrofuran with a drop of galcial acetic acid.

EXAMPLE 12

2,884 g of 2,2,4,4-tetramethyl cyclobutanediol-1,3 (0.2 mol) are weighed in with 3,714 g of diphenyl silane (0.7% excess). After addition of 1 drop potassium methylate solution there immediately set in a violent exothermic condensation reaction so that within about 1 minute the entire theoretical amount of hydrogen, about 1 liter, had been generated. At 150° C in vacuum re-condensation took place. When the condensation was carried out in anhydrous dioxane as solvent with an otherwise identical reaction mixture the reaction proceeds less violently.
Yield: 6,38 g (98.4% of the theory),
Softening point: 105° to 120° C,
η red: 0.4 dl/g (0.5% in tetrahydrofuran with a drop of glacial acetic acid)

EXAMPLE 13 a. 2,774 g of cyclohexane dimethanol (0.02 mol) are condensed with 3,703 g of diphenyl silane, after addition of 0.1 ml of a 1% solution of $H_2PtCl_6$ in isopropanol, first at 100° c, then at 150° C. After 7 hours, only about 70% of the theoretical amount of $H_2$ had developed and the melt had solidified into a cross-linked, rubber-like product which contained soluble portions of only 5% by weight.

b. From bisphenol A (4,566 g) and diphenyl silane (3,691 g), after initiation with $H_2$ ($PtCl_6$), a slightly cross-linked polymer was obtained which to 70% was soluble in tetrahydrofuran.

EXAMPLE 14

4,566 g of bisphenol A (0.02 mol) were polycondensed with 3,736 g of diphenyl silane, after addition of 0,1 mol-% tin tetrachloride, at 175° C. After ca. 12 hours, the melt was finish condensed in vacuum.
Yield: 7.93 g (97% of the theory),
η red: 0.3 dl/g (0.5% in tetrahydrofuran).
What is claimed is:

1. Method of preparing high molecular weight polysiloxane polymers having recurring units of the formula:

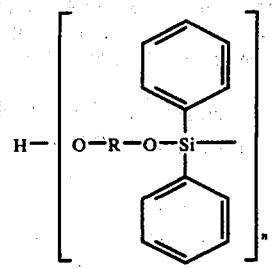

$x = 1 - 3$; $n = 100 - 500$
wherein:
R is divalent arylene, or alkylene, which comprises reacting a dihydroxy compound of the formula H-O-R-OH wherein R is alkylene or arylene with diphenyl silane in the liquid phase at about 0° to 300° C in contact with a catalyst selected from the group consisting of alkali metals, alkali metal hydrides, alkali metal salts of acids whose pK-value is greater than 4 which alkali metal salts in aqueous solution react in a neutral or basic manner, Lewis bases, Lewis acids, active hydrogenation catalysts, amines having a pK-value of less than 5 and hexachloroplatinic acid, and recovering a polysiloxane polymer having between 100 and 500 recurring units.

2. Method claimed in claim 1 wherein there is additionally present in said reaction mixture at least one polyhydroxy compound having more than 2 hydroxyl groups bonded to R.

3. Method claimed in claim 1 carried out at 50° to 230° C.

4. Method claimed in claim 1 carried out in an an aprotic anhydrous inert solvent.

5. Method claimed in claim 1 carried out at temperatures above the melting point of the reactants such that the same are in liquid phase in a melted form.

6. Method claimed in claim 1 wherein said active hydrogenation catalyst is a member selected from the group consisting of platinum, palladium, and Raney nickel.

7. Method as claimed in claim 2 whereinsaid polyhydroxy compound is present in a proportion of up to about 10 % by weight based upon the combined amount of hydroxy compounds employed in the preparation of the high molecular weight polysiloxane polymer.

8. Method as claimed in claim 1 wherein said diphenylsilane is present in a mole excess of about 0.1 to 5% based upon the moles of hydroxy compounds present.

9. Method as claimed in claim 1 wherein said dihydroxy compound is a member selected from the group consisting of hydroquinone, resorcinol, 2,4-dihydroxynaphthalene, 2,5-dihydroxynaphthalene, 2,7-dihydroxynaphthalene, 4,4'-dihydroxy diphenyl, 2,4'-dihydroxy diphenyl, 3,3'-dihydroxy-diphenyl, 4,4'-dihydroxy diphenyl, 4,4'-dihydroxy-2-methyldiphenyl, 4,4'-dihydroxy-2,2'-dimethyl diphenyl, 4,4'-dihydroxy-3,3-dimethyl diphenyl, 4,4'-dihydroxy-3,3', 5,5'-tetramethyldiphenyl, 4,4'-dihydroxy-diphenyl methane, 4,4'-dihydroxy-diphenyl ether or sulfone, or 4,4'-dihydroxytetraphenyl methane, phloroglucide and phenolphthalein, 1:3-dihydroxynaphthalene, 1:4-dihydroxynaphthalene, 1:5-dihydroxynaphthalene, 1:6-dihydroxynaphthalene, 1:7-dihydroxynaphthalene, 2:6-dihydroxynaphthalene, 2:6:8-trihydroxynaphthalene and their corresponding anthracenes and/or phenanthracenes; ethylene glycol, trimethylene glycol and the corresponding polyol compounds, cyclohexane dimethanol, and 2,2,4,4,-tetramethyl-cyclobutanediol-1,3.

10. Method as claimed in claim 4 wherein said solvent is at least one member selected from the group consisting of toluene, xylene, dioxane, tetrahydrofurane, pyridine, dimethylformamide, dimethylacetamide, diethylformamide, and aniline.

11. Method of preparing high molecular weight polysiloxane polymers having recurring units of the formula:

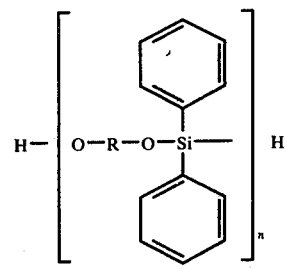

$n = 100 - 500$
wherein:
R is divalent arylene or alkylene, which comprises reacting a dihydroxy compound of the formula H—O—R—OH wherein R is alkylene or arylene with diphenyl silane in the liquid phase at about 0° to 300° C in contact with a catalyst selected from the group consisting of alkali metals, alkali metal hydrides, alkali metal salts of acids whose pK-value is greater than 4 which alkali metal salts in aqueous solution rect in a neutral or basic manner, Lewis bases, Lewis acids, active hydrogenation catalysts, and amines having a pK-value of less than 5, and recovering a polysiloxane polymer having between 100 and 500 recurring units.

* * * * *

UNITED STATES PATENT AND TRADEMARK OFFICE
CERTIFICATE OF CORRECTION

PATENT NO. : 4,026,827

DATED : May 31, 1977

INVENTOR(S) : Steffen

It is certified that error appears in the above—identified patent and that said Letters Patent are hereby corrected as shown below:

Title Page, Abstract [57], "= 1 - 3" should read
-- X = 1-3 --.

Title Page, Abstract [57], in the top formula " + " should read -- $\rightarrow$ --.

Column 8, line 16, delete " x = 1-3 ".

Signed and Sealed this

Twenty-third Day of January 1979

[SEAL]

Attest:

RUTH C. MASON
Attesting Officer

DONALD W. BANNER
Commissioner of Patents and Trademarks